(12) United States Patent
Eddings et al.

(10) Patent No.: US 9,525,959 B1
(45) Date of Patent: Dec. 20, 2016

(54) LANGUAGE SELECTION FOR USER EQUIPMENT INTERFACE DURING INITIALIZATION

(71) Applicant: Sprint Communications Company L.P., Overland Park, KS (US)

(72) Inventors: Justin Eddings, Eudora, KS (US); Michelle E. Masterson, Overland Park, KS (US); Tammy M. Otten, Bonner Springs, KS (US); Bret D. Sumner, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/737,438

(22) Filed: Jun. 11, 2015

(51) Int. Cl.
| | |
|---|---|
| *H04M 3/00* | (2006.01) |
| *H04W 4/00* | (2009.01) |
| *H04W 8/18* | (2009.01) |
| *H04M 1/725* | (2006.01) |

(52) U.S. Cl.
CPC ......... *H04W 4/001* (2013.01); *H04M 1/72572* (2013.01); *H04W 8/183* (2013.01)

(58) Field of Classification Search
USPC .................................. 455/418, 419
See application file for complete search history.

(56) References Cited

U.S. PATENT DOCUMENTS

| | | | | |
|---|---|---|---|---|
| 2012/0309377 A1* | 12/2012 | De Atley | .............. | H04W 8/245 455/418 |
| 2013/0217377 A1* | 8/2013 | Yu | ..................... | H04M 1/72572 455/418 |

* cited by examiner

*Primary Examiner* — Joel Ajayi (57) ABSTRACT

A mobile communication device comprising a radio transceiver to communicatively couple the mobile communication device to a radio access network by a wireless communication link, a processor coupled to the radio transceiver, a memory coupled to the processor, and an application stored in the memory that, when executed by the processor, collects language information for use in determining a default language for the mobile communication device, analyzes the language information to determine a probability of accuracy of the default language, and assigns the default language to the mobile communication device.

11 Claims, 9 Drawing Sheets

LANGUAGE SELECTION FOR USER EQUIPMENT INTERFACE DURING INITIALIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices continue to play a significant role in the daily lives of many people. As such, the user experience and associated user satisfaction may be an area of concern for mobile communication device manufacturers. Many times, a user's first interaction with the mobile communication device may be the out-of-the-box setup experience of the mobile communication device. To facilitate a favorable user experience, and corresponding satisfaction with the mobile communication device, it may be desirable to optimize the out-of-the-box experience for the user. To do so, it may be desirable to predict a primary language employed by the user for display during the out-of-the-box setup of the mobile communication device.

SUMMARY

In an embodiment, a mobile communication device is disclosed. The mobile communication device comprises a radio transceiver to communicatively couple the mobile communication device to a radio access network by a wireless communication link, a processor coupled to the radio transceiver, a memory coupled to the processor, and an application stored in the memory. When executed by the processor, the application collects language information for use in determining a default language for the mobile communication device, analyzes the language information to determine a probability of accuracy of the default language, and assigns the default language to the mobile communication device.

In an embodiment, a method of performing an out-of-the-box mobile communication device setup process on a mobile communication device is disclosed. The method comprises determining a default language via a processor of the mobile communication device for use during the mobile communication device setup process according to ambient information, wherein the ambient information indicates a probable language associated with a geographic region in which the mobile communication device is located during the mobile communication device setup process, presenting a user via a screen of the mobile communication device with one or more screens of visual feedback according to the determined default language, and receiving from the user via the mobile communication device, control input in response to the visual feedback. Based on the received control input, the method executes instructions via the processor of the mobile communication device to progress to a next step in the mobile communication device setup process when the received control input indicates to progress to the next step, display via the screen of the mobile communication device a list of user-selectable options when the received control input indicates to present the user-selectable options, and toggle a state of the user-selectable options when the received control input indicates to toggle the state of the user-selectable options.

In an embodiment, a method of determining a default language for a mobile communication device according to a Uniform Integrated Circuit Card (UICC) is disclosed. The method comprises executing a bootstrap application via a processor of the mobile communication device, wherein the bootstrap application comprises instructions for transmitting a request for profile information to a bootstrap server via a transceiver of the mobile communication device, receiving the profile information for the UICC from the bootstrap server via the transceiver, and populating profile fields of the UICC according to the received profile information, wherein populating the profiles fields comprises writing the received profile information to the UICC. When a populated profile field of the UICC indicates a preferred language for the mobile communication device, the method further comprises setting the default language of the mobile communication to the preferred language, and when no populated profile field of the UICC indicates a preferred language for the mobile communication device, comparing a mobile country code (MCC) value of the UICC with one or more default language determination factors in a weighted comparison.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mobile communication devices continue to permeate the global market, devices are produced that are operable without regard to location. A device purchased in one country may be operable in another country, and vice versa. To further ease and facilitate this interoperability, device manufacturers are making brand agnostic devices that are capable of operating on any number of mobile communication service carrier networks that each have a slightly different setup and configuration process. As a result, in order to provide a favorable user experience that promotes simplicity and efficiency, the device manufacturers may choose to provide a standardized out-of-the-box experience for the mobile communication devices, regardless of the network on which the devices ultimately operate. However, to do this with devices that may be distributed worldwide, the device manufacturers may want to ensure that a user of the mobile communication device is capable of understanding the language in which the out-of-the-box experience is presented.

A default language for use in a mobile communication device out-of-the-box experience may be determined in a plurality of manners according to ambient information from an area adjacent to the mobile communication device, many with minimal added complexity. For example, the ambient information may comprise a subscriber identification module (SIM) card in the mobile communication device and may be examined to determine a country in which the mobile communication device is operating. The ambient information may also comprise non-specific environmental factors such as network router addresses and/or ambient noise received through a microphone of the mobile communication device. Alternatively, the ambient information may be any environmental information accessible to the mobile communication device from an area around the mobile communication device that provides environmental indications to an initial language determination module. Additionally, the mobile communication device may search for and examine wireless network names to determine linguistic characteristics and/or factors that may indicate a particular cultural or geographic area in which the mobile phone is operating, thereby providing a suggested default language for the mobile device. Wireless network names may be assigned by consumers to their consumer electronic devices (e.g., wireless network routers and/or hotspots) to facilitate unique identification of the consumer electronic devices. An analysis of these assigned names may suggest a predominate language for the area in which the wireless networks are available, and thereby aid in the mobile communication device inferring a default language. Further alternative means of determining a default language for the mobile device include download from servers during the out-of-the-box experience, determination as a result of ambient sounds in near proximity to the mobile communication device, or a predefined preference of a user of the mobile communication device.

For the purposes of determining a default language for use in a mobile communication device out-of-the-box experience, ambient and/or environmental information received from wireless network routers does not include express indications of, or serve as a proxy that suggests, a preferred language. For example, a wireless network router may broadcast a plurality of data packets related to a wireless network created by the wireless network router. The data packets may include a wireless network name, a country code, a language setting, and/or other forms of data. When a country code, language setting, and/or other form of data that comprises an express indication of a language is included in data packets broadcast by the wireless network router, that data is disregarded by the initial language determination module and only non-express indications are used to aid in determining the default language.

Single dimensional initial language selection models, such as a model that bases an initial language selection solely on geographic location, may fail to account for environmental or ambient factors that could prove determinative in a manner that varies from the initial language determined according to the geographic location. For example, an English speaking user may initiate a mobile communication device out-of-the-box setup process in Japan. A single dimensional initial language selection model would likely identify Japanese as the appropriate initial language and set the mobile communication device's language to Japan, thereby frustrating the user. In contrast, a model that bases an initial language selection on a plurality of weighted factors would have a greater probability of identifying a correct and appropriate initial language. For example, if the mobile communication device of the above user in Japan detects a plurality of wireless routers configured in the English language in a close proximity to the mobile communication device, and using microphones of the mobile communication device detects the English language being spoken in the immediate vicinity of the mobile communication device, English would be selected as the appropriate initial language despite the mobile communication device being physically located in Japan. Such a model that incorporates multiple weighted factors in determining an initial language selection provides a greater probability of correctly determining the appropriate initial language selection and providing a user with an improved user experience when compared to single dimensional initial language selection models.

In such a model based on a plurality of weighted factors, ambient information may be potentially ambiguous information that allows for the drawing of an inference while not being determinative. For example, an English-speaking college student using a mobile communication device that is determining an initial language selection may be located near a plurality of foreign exchange students having a plurality of wireless network names that have traditionally French names (e.g., Frangoise and Jacques). If the ambient information were determinative (e.g., if the ambient were an express indication of language such as a mobile country code of a SIM card and/or a pre-set initial language selection downloaded from a users preferences), the wireless network names would be detected by the mobile communication device and lead to an initial language selection of French. However, the ambient information is non-determinative and is used to infer an appropriate initial language selection. As such, although the wireless network names indicate that French would be an appropriate initial language selection, other factors in the weighted set (e.g., express factors and/or other ambient information) will indicate that the initial language selection should in fact be English. Generally, in some embodiments express indications of an appropriate initial language selection will carry greater determinative weight than non-express indications, such as indications inferred from ambient wireless network information.

Figure 1:
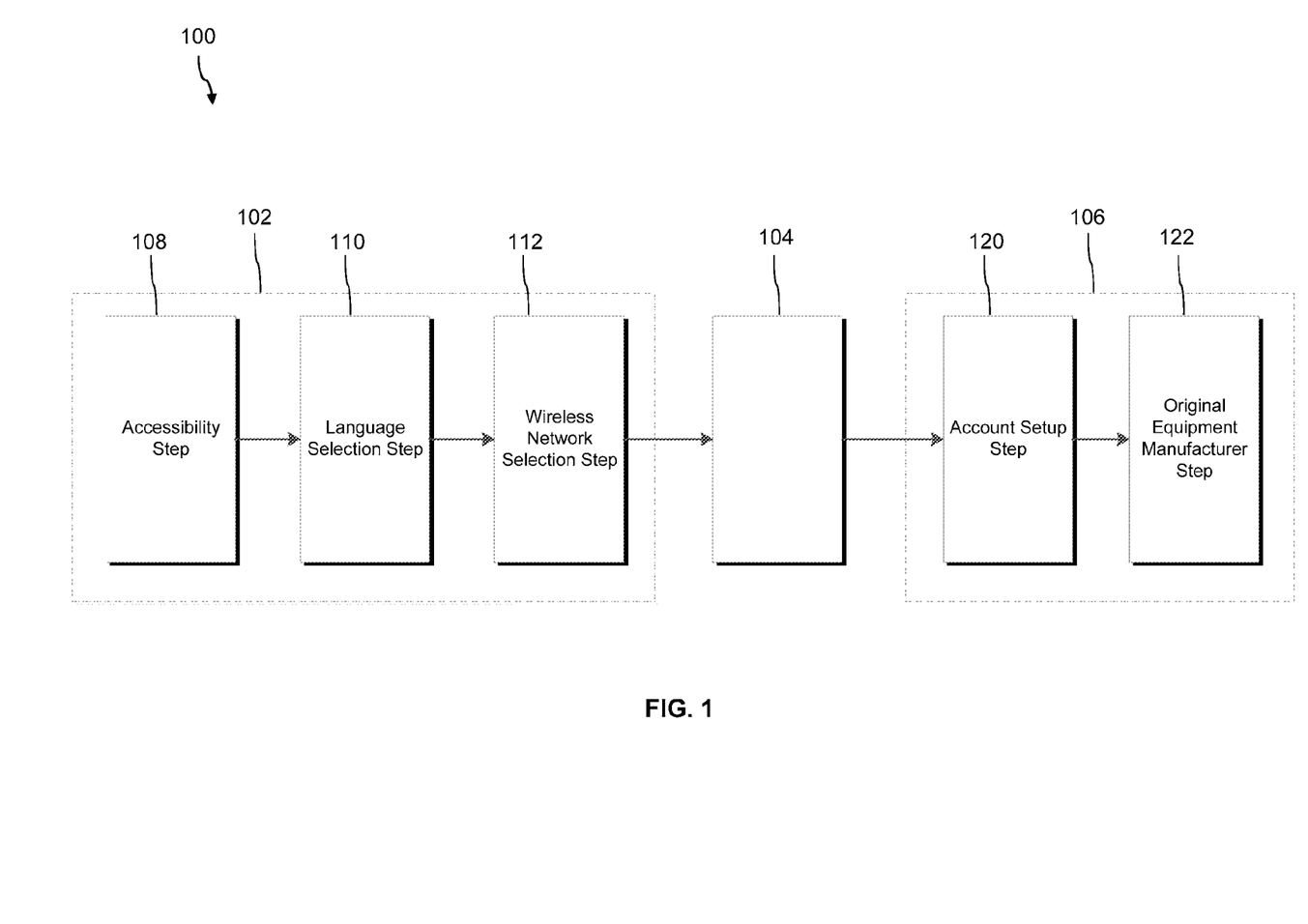
FIG. 1 is a flow chart illustrating a mobile communication device setup process according to an embodiment of the disclosure.

Making reference now to FIG. 1, an embodiment of a mobile communication device setup process 100 is disclosed. In some embodiments, process 100 may be referred to as an out-of-the-box experience. Process 100 comprises an accessibility phase 102, an activation phase 104, and a user setup phase 106. In some embodiments, a accessibility phase 102 and activation phase 104 may be device agnostic, for example, accessibility phase 102 and activation phase 104 may be substantially similar for a plurality of mobile communication devices without regard to a brand or service carries or the mobile communication devices. For example, the combination of accessibility phase 102 and activation phase 104 may be substantially similar for all mobile communication devices without regard to brand, location, and/or service carrier. Accordingly, the mobile communication device may have no knowledge of its brand, location, and/or service carrier until the mobile communication device has progressed through at least a portion of process 100. For example, in one embodiment the mobile communication device may have no knowledge of its brand, location, and/or service carrier until at least the beginning of activation phase 104.

Returning to FIG. 1, in some embodiments accessibility phase 102 comprises an accessibility step 108, a language selection step 110, and a wireless network selection step 112. Prior to displaying accessibility step 108, the mobile communication device determines a default language for, in some embodiments, displaying visual feedback to a user on a screen of the mobile communication device and/or playing audible feedback and/or directions to the user via a speaker of the mobile communication device. The process of determining the default language will be discussed in greater detail below.

Accessibility step 108 comprises visual and/or audible feedback to the user of the mobile communication device, and occurs in the determined default language. The feedback elicits a control input to the mobile communication device from the user. The control input may be any means of interacting with a mobile communication device that is known to one of ordinary skill in the art. The control input directs the mobile communication device to progress to the next step of the accessibility phase 102 or to present the user with accessibility options that may be activated on the mobile communication device (e.g., enlarged text, captions, additional and/or alternate functions for input devices of the mobile communication device, magnification of select areas of the mobile communication device screen, and/or a feature that verbalizes text found on the screen of the mobile communication device). For the remainder of process 100, in some embodiments, various options as selected in accessibility step 108 may alter the feedback provided to the user. For clarity of description, such alterations are omitted from the following discussions while being maintained in their entirety, along with equivalents, within the scope of the present disclosure.

Language selection step 110 comprises visual feedback to the user of the mobile communication device, and occurs in the determined default language. The feedback elicits a control input to the mobile communication device from the user. The control input directs the mobile communication device to confirm the determined default language as the user's preferred language for use on the mobile communication device, or allows the user to select and confirm an alternative preferred language. In some embodiments, discussed below, language selection step 110 may be omitted, and the user's preferred language is obtained by the mobile communication device through alternative means. Such alternative means of obtaining the user's preferred language may include, non exclusively, inclusion of preferred language in a provisioning payload obtained by the mobile communication device, and/or obtaining the preferred language preference from an online user account that is synchronized with the mobile communication device during user setup phase 106 of process 100. Subsequent to language selection step 110, the mobile communication device provides visual and/or audible feedback to the user in the user's preferred language.

Wireless network selection step 112 comprises visual feedback to the user of the mobile communication device. The feedback elicits a control input to the mobile communication device from the user. The control input directs the mobile communication device to display a listing of service set identifiers (SSIDs) for wireless networks within range of the mobile communication device. From the listing of service set identifiers, the user provides a control input to continue to the next step in process 100 without connecting the mobile communication device to a wireless network, or alternatively, provides a control input selecting a wireless network to connect to the mobile communication device. In some embodiments, in response to the user selecting a wireless network for connecting to the mobile communication device, the user is provided additional visual feedback for entry of login credentials and/or a password for the wireless network. If the mobile communication device is unable to connect to the selected wireless network, additional feedback may be provided to the user.

Subsequent to completion of wireless network selection setup 112 through a successful connection to a wireless network, or notification of the inability to connect to a wireless network, the mobile communication device progresses to activation phase 104 of process 100. In some embodiments, activation phase 104 is referred to as a hands free activation phase. During activation phase 104, the mobile communication device operates autonomously in a manner that is invisible to the user of the mobile communication device. For example, during activation phase 104, the user is provided visual feedback that remains in the foreground of the screen of the mobile communication device and indicates a progress status of activation phase 104 while hiding the operations of the individual steps of activation phase 104 from the user's view. The individual steps of activation phase 104 that occur in the background may vary, but in some embodiments may include configuring radio access network operational parameters, downloading and/or upgrading mobile communication device firmware, downloading customization options and/or preferences, and/or other similar functions that define or determine the connectivity and base functionality of the mobile communication device.

During activation phase 104, the mobile communication device, in some embodiments, acquires identifying information for the mobile communication device. This information may be acquired from, for example, an Open Mobile Alliance (OMA) server in the form of a branding payload and/or a user specific payload. The branding payload may comprise information that identifies to the mobile communication device a brand with which the mobile communication device is associated, and on what service carrier (e.g., what wireless communication service provider network) it will operate. The branding payload may give direction to a mobile identification client for use in determining a setup process for the user in user setup phase 106. The user specific payload may comprise a phone number, roaming settings, authentication information, and/or other information required to uniquely identify the mobile communication device as having the characteristics necessary for a particular user. For example, the mobile communication device may be capable of operating on a plurality of service carrier networks and/or brands, and process 100 may be brand and/or carrier agnostic until the completion of activation phase 104. Immediately after completion of activation phase 104, the mobile communication device may have knowledge of its association with one of the plurality of service carrier networks and/or brands. In some embodiments, the process of determining a brand that is identified with the mobile communication device may be referred to as brand identification. After completion of activation phase 104, and after a brand is associated with the mobile communication device, the user is provided with feedback that indicates the mobile communication device must reboot before proceeding.

Subsequent to the reboot required after completion of activation phase 104, the mobile communication device enters user setup phase 106. User setup phase 106 comprises an account setup step 120 (e.g., a GOOGLE™ account setup and/or account data synchronization) and an original equipment manufacturer setup step 122. According to the information received in the branding payload during activation phase 104, the mobile identification client downloads one or more payloads for deployment on the mobile communication device. These payloads comprise one or more setup operations during which the user is presented with options for customizing the experience of the mobile communication device. As one of ordinary skill in the art will recognize, the particular feedback presentation and/or options for user input may vary in account setup step 120 and original equipment manufacturer setup step 122 according to the type and quantity of information that is to be obtained from the user. At the completion of user setup phase 106, process 100 terminates and the user is presented with the home screen of the mobile communication device.

Figure 2:
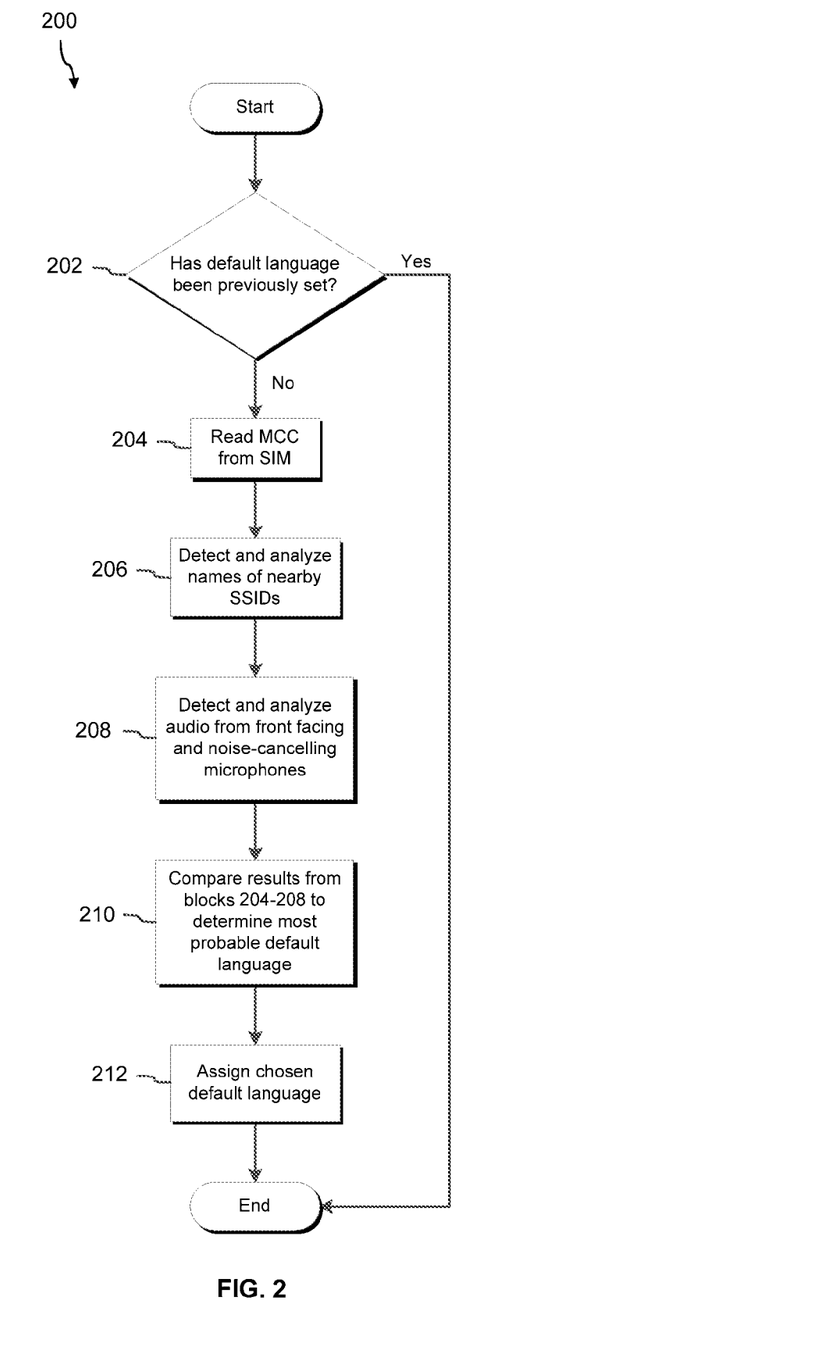
FIG. 2 is a flow chart illustrating a language determination method according to an embodiment of the disclosure.

Turning now to FIG. 2, an embodiment of a default language determination method 200 is described. At block 202, the mobile communication device performs a check to verify that a default language has not been set previously. For example, the mobile communication device may only desire determination of the default language when progressing through process 100 and may not desire determining a new default language after the mobile communication device has temporarily lost and/or changed its association with a particular brand and/or service carrier (e.g., through the removal and/or replacement of a SIM card in the mobile communication device).

At block 204, when the mobile communication device determines that a default language has not been set, the SIM card installed in the mobile communication device is analyzed to provide a probable default language. For example, a mobile country code (MCC) of the SIM card may be read by the mobile communication device to determine a country in which the SIM card's service provider operates, thereby determining a language that is associated with that country. Alternatively, other characteristics of the SIM card may be examined to identify the service provider associated with the SIM card, which would then be compared to a list of corresponding default languages to be used. For example, the mobile communication device may examine a mobile network code (MNC) of the SIM card to determine a particular company with which the SIM card is associated, and therefore a probable default language for the mobile communication device according to commonly spoken languages in the country in which the company operates. As would be known to one of ordinary skill in the art, the present disclosure makes reference to a SIM card, but will apply equally to all Universal Integrated Circuit Cards (UICC) whether removable or non-removable, each of which is included within the scope of this disclosure.

At block 206, the mobile communication device analyzes nearby wireless network SSIDs to provide a probable default language. For example, when the mobile communication device is first turned on to begin process 100, the mobile communication device may begin searching for names of available wireless networks that are located nearby (e.g., sniffing wireless network SSIDs). In some embodiments, the mobile communication device may search for a predefined number of wireless network SSIDs, for example, not less than three but not more than five SSIDs. After finding a selection of wireless network SSIDs, the mobile communication device analyzes the characters used in the SSIDs to make an alphanumeric based conclusion as to a probable default language. For example, the mobile communications device may detect three SSIDs: "This is John's WiFi," "Se Trata de WiFi de Esteban," and "This is Esteban's WiFi." After analyzing the characters used in the three detected SSIDs, the mobile communication device determines that two English SSIDs and one Spanish SSID are present. However, the Spanish SSID contains no language specific characters, so it was likely typed using an English system. As a result, the mobile communication device is able to determine that the device is most likely in an English speaking area and the default language should be set to English.

In some embodiments, in block 206, the mobile communication device may analyze personal names used in the SSIDs to detect cultural name variations to provide a probable default language. For example, SSIDs using names such as "Michael," "Miguel," "Michel," and "Mikhail" might each indicate a particular cultural identity that would be indicative of a particular probable default language. In other embodiments, the mobile communication device may compare words used in the SSIDs to popular fictional, movie, and/or television to infer a probable default language. In other embodiments, the mobile communication device may examine particular words used in the SSIDs to determine whether the words are predominantly used in a particular geographic or language speaking area to infer a probable default language.

At block 208, the mobile communication device analyzes ambient sound to provide a probable default language. For example, the mobile communication device may use a forward and/or front facing microphone to listen to speech and/or utterances of a user of the device and use a noise-cancelling microphone to listen to ambient sound around the user. The mobile communication device would then compare the audio sample from the forward facing microphone to the audio sample from the noise-cancelling microphone to determine whether the user and the ambient sounds are of a particular language, and what that particular language is that could be the probable default language for the mobile communication device.

At block 210, the mobile communication device compares the results determined at block 204, block 206, and block 208 to determine a default language to assign to the mobile communication device. For example, the probable default language determined from analyzing the SIM card in block 202, the probable default language determined from analyzing nearby SSIDs in block 204, and the probable default language from the ambient sound in block 206 may be assigned a weighted value according to a level of confidence in the accuracy of their determination of the probable default language. According to the weighted values, the most likely default language that has the highest probability of success is determined and selected for assignment. At block 212, the determined default language is assigned to the mobile communication device.

Figure 3:
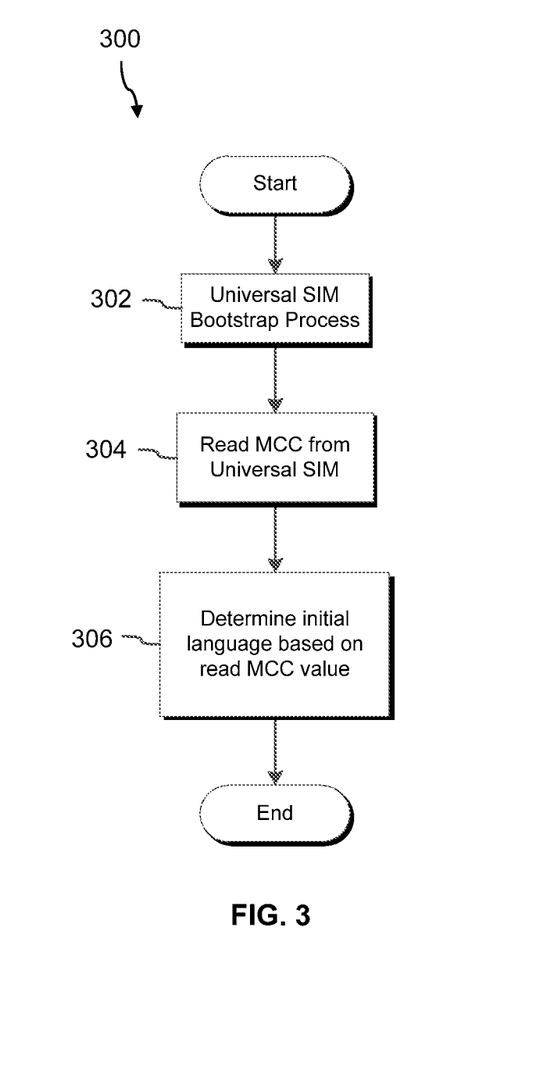
FIG. 3 is a flow chart illustrating another language determination method according to an embodiment of the disclosure.

Turning now to FIG. 3, an embodiment of a default language determination method 300 for a mobile communication device with a universal SIM card is described. The universal SIM card may be a removable card, or alternatively the universal SIM card may be an Embedded Universal Integrated Circuit Card (EUICC) that is not removable. For example, a universal SIM card in a mobile communication device may be blank (e.g., no profiles are stored on the universal SIM card) when the mobile communication device is first turned on for an initial setup. To determine the information needed for the universal SIM card to function (e.g., the MCC and/or the MNC that aid in determining a default language), as shown in block 302, the universal SIM card may undergo a bootstrapping process during which time information is downloaded by the mobile communication device from a bootstrap server and saved to the universal SIM card. Specifically, in one embodiment, the universal SIM card may request information from the bootstrap server that indicates one or more profiles that are needed by the universal SIM. In response to the information received from the bootstrap server, the universal SIM downloads and saves the necessary profiles. The mobile communication device, based on the information received from the bootstrap server, would set the default profile and associated MCC. After setting the default profile, the universal SIM card would request a refresh prior to proceeding with the initial setup process for the mobile communication device. In some embodiments, block 302 may be performed in a manner that is invisible to the user of the mobile communication device.

At block 304, the mobile communication device reads the profile information contained in the universal SIM card to determine an MCC in a manner substantially similar to block 204, described above.

At block 306, according to the MCC received from the universal SIM, the mobile device determines an initial default language for use during the initial setup of the mobile communication device. For example, if the mobile communication device determines that the MCC associated with the universal SIM card is 310, the mobile communication device will set English as the default language. Alternatively, for example, if the mobile communication device determines that the MCC associated with the universal SIM card is 440, the mobile communication device will set Japanese as the default language. As one of ordinary skill in the art will know, the above procedure is equally applicable to all MCC values and is meant only to be exemplary in nature while not excluding any potential MCC values or default language selections from within the scope of the present disclosure.

Alternatively, in some embodiments, the user may set a preferred language at the time of establishing service with a particular service carrier. The preferred language would then be received by the mobile communication device during the bootstrap process and utilized in place of determining a language based on the universal SIM card's MCC.

Figure 4:
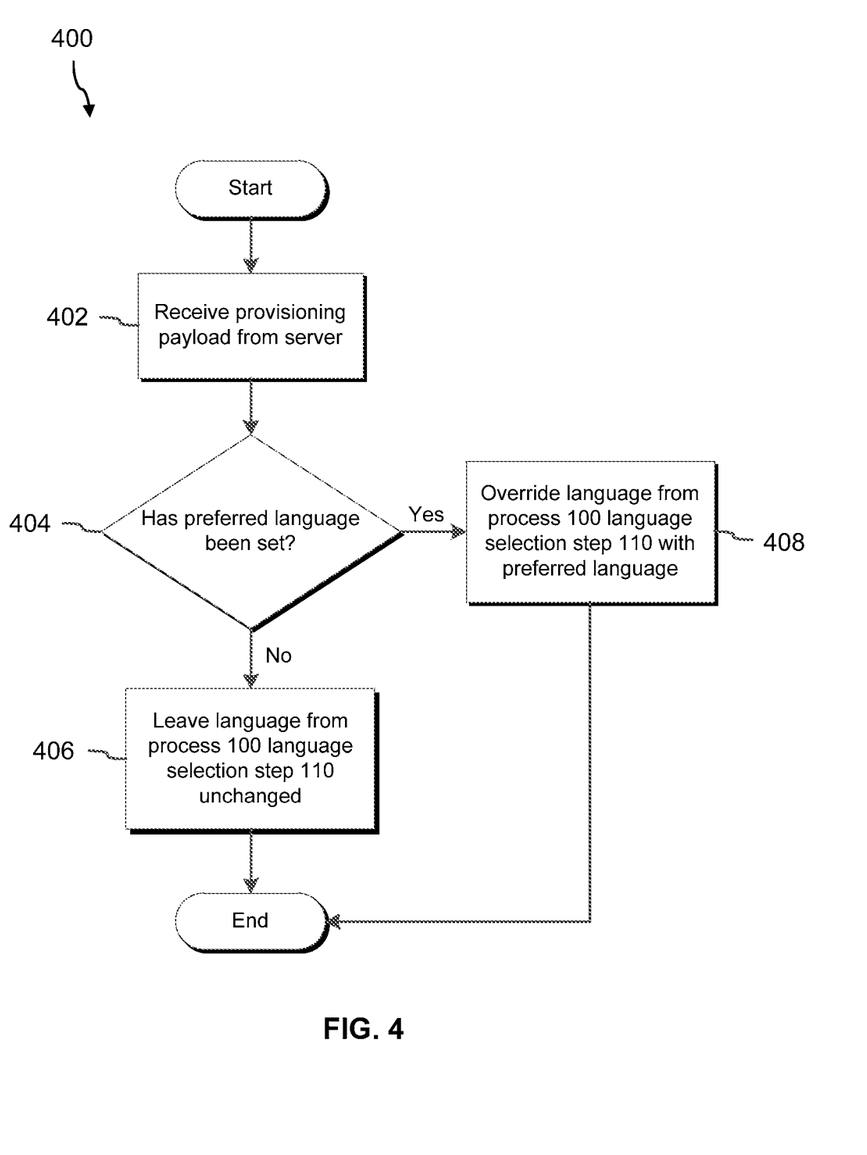
FIG. 4 is a flow chart illustrating yet another language determination method according to an embodiment of the disclosure.

Turning now to FIG. 4, an embodiment of a provisioning payload language selection method 400 is described. In some embodiments, a preferred language selection may have been previously set by the user. At step 402, the mobile communication device receives a provisioning payload from a server, for example, via a connection to a radio access network. At step 404, the mobile communication device determines, according to the received provisioning payload, whether a preferred language has previously been set by the user. For example, the preferred language selection may have been previously received from the user during setup of another mobile communication device and saved to an account of the user, and/or the preferred language selection may have been previously received from the user via an input of preferences for an online account.

At step 406, when the mobile communication device determines that a preferred language has not been previously set by the user, the mobile communication device leaves the default language and/or the language selected by the user in language selection step 110 unchanged.

At step 408, when the mobile communication device determines that a preferred language has been previously set by the user, the mobile communication device overrides the default language and/or the language selected by the user in language selection step 110 with the preferred language that was previously set by the user and provided in the provisioning payload. In some embodiments, when a language preference is included in the provisioning payload, language selection step 110 may be omitted. In some embodiments, when a language preference is included in the provisioning payload, the mobile communication device may receive a corresponding computer program comprising digital data assets that are necessary for producing audible and/or visual feedback in the preferred language.

Figure 5:
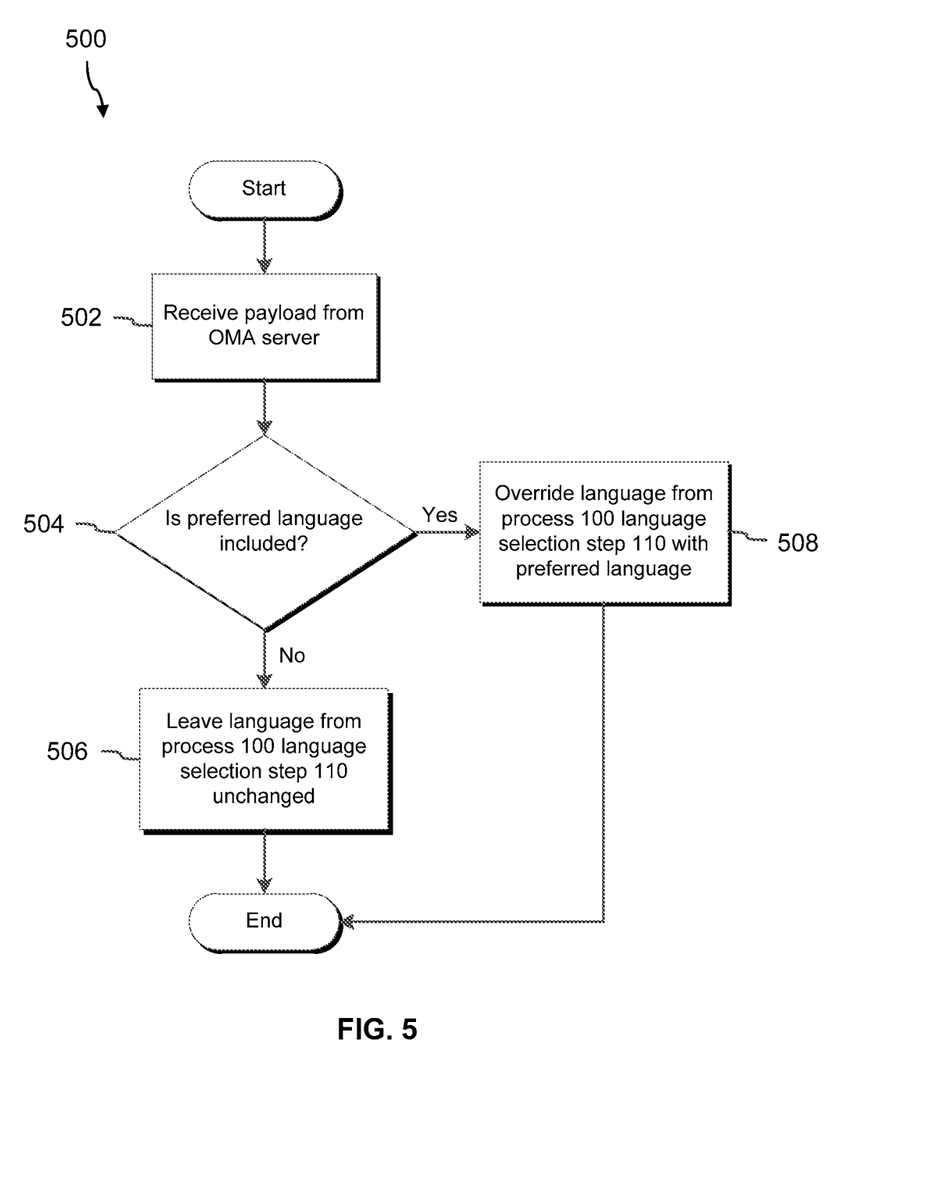
FIG. 5 is a flow chart illustrating yet another language determination method according to an embodiment of the disclosure.

Turning now to FIG. 5, an embodiment of an OMA payload language selection method 500 is described. In some embodiments, a preferred language selection may be included in a payload package received from the OMA server during activation step 104. Alternatively, a default language may be chosen according to the OMA server to which the mobile communication device connected for payload downloads. At step 502, the mobile communication device receives a payload from the OMA server. At step 504, the mobile communication device determines whether a preferred language was previously set and is included in the received payload. For example, such a preferred language selection would be identified to the service carrier by the user at the time of purchasing service for the mobile communication device. Alternatively, the preferred language may have been present on a mobile communication device that was previously used by the user, and transmitted to the OMA server for inclusion with a payload to be delivered to a new mobile communication device of the user that is undergoing process 100.

At step 506, when the mobile communication device determines that a preferred language is not included in the received payload, the mobile communication device leaves the default language and/or the language selected by the user in language selection step 110 unchanged.

At step 508, when the mobile communication device determines that a preferred language is identified in the received payload, the mobile communication device overrides the default language and/or the language selected by the user in language selection step 110 with the preferred language that was previously set by the user and provided in the provisioning payload. In some embodiments, when a language preference is included in the received payload, language selection step 110 may be omitted. In some embodiments, when a language preference is included in the received payload, the mobile communication device may receive a corresponding computer program comprising digital data assets that are necessary for producing audible and/or visual feedback in the preferred language.

Figure 6:
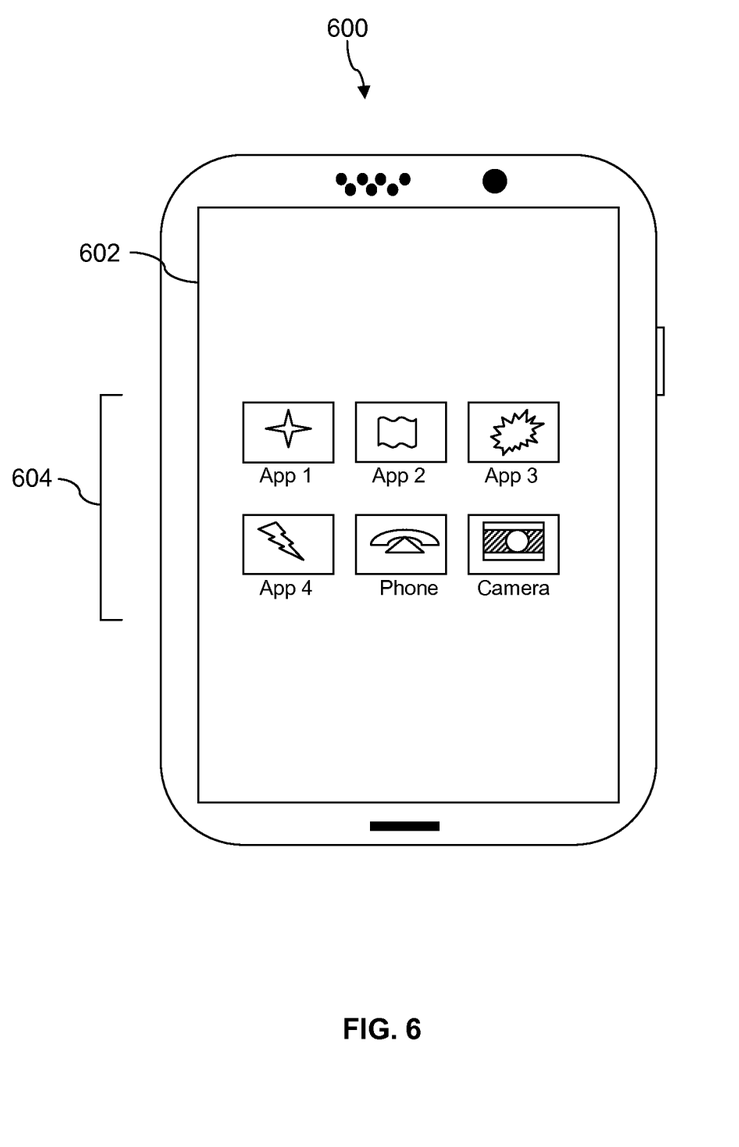
FIG. 6 is an illustration of a mobile communication device according to an embodiment of the disclosure.

FIG. 6 depicts the user equipment (UE) 600, which is operable for implementing aspects of the present disclosure, but the present disclosure should not be limited to these implementations. In some embodiments, the UE 600 may be referred to as a mobile communication device. Though illustrated as a mobile phone, the UE 600 may take various forms including a wireless handset, a pager, a personal digital assistant (PDA), a gaming device, or a media player. The UE 600 includes a touch screen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present visual and/or audible feedback to the user to provide the user with directions, information, and/or options. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may accept input from the user in the form of tactile input and/or feedback received by touch screen display 602. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application that enables the touch screen display 602 to show a web page. The web page may be obtained via wireless communications with a base transceiver station, a wireless network access node, a peer UE 600 or any other wireless communication network or system.

Figure 7:
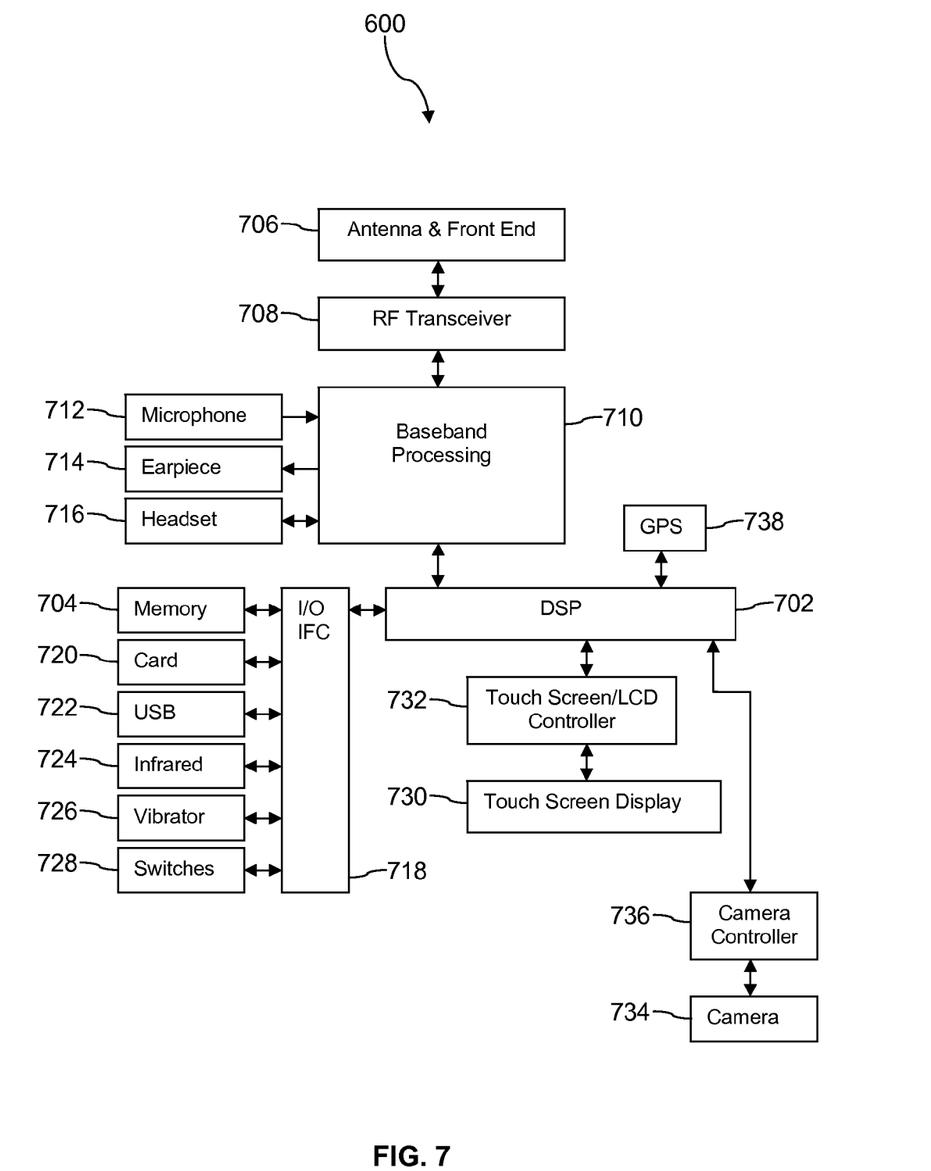
FIG. 7 is a block diagram of a mobile communication device according to an embodiment of the disclosure.

FIG. 7 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include an antenna and front end unit 706, a radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen liquid crystal display (LCD) with a touch screen display 730, a touch screen/LCD controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth interface or an IEEE 802.11 compliant wireless interface may enable the UE 600 to communicate wirelessly with other nearby handsets and/or wireless base stations. In an embodiment, the UE 600 may comprise a near field communication (NFC) transceiver. The NFC transceiver may be used to complete payment transactions with point-of-sale terminals or other communications exchanges. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 8A:
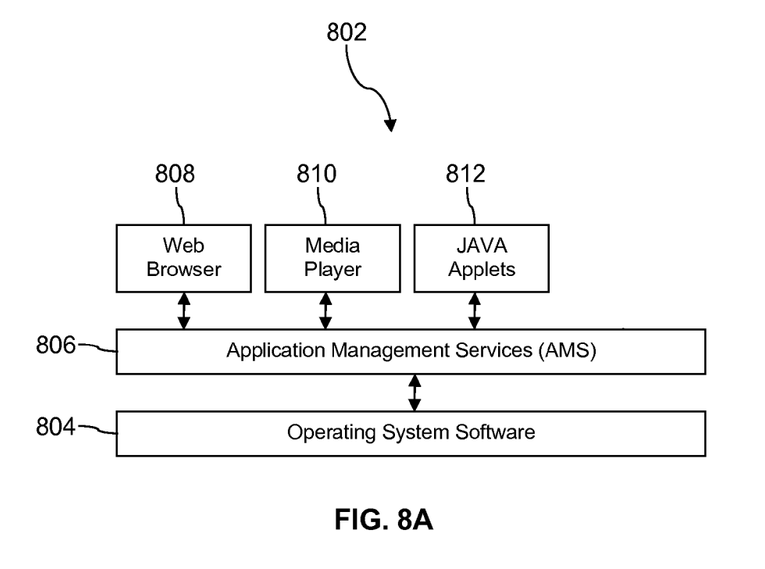
FIG. 8A is a block diagram of a software architecture of a mobile communication device according to an embodiment of the disclosure.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 600. Also shown in FIG. 8A are a web browser application 808, a media player application 810, and JAVA applets 812. The web browser application 808 may be executed by the UE 600 to browse content and/or the Internet, for example when the UE 600 is coupled to a network via a wireless link. The web browser application 808 may permit a user to enter information into forms and select links to retrieve and view web pages. The media player application 810 may be executed by the UE 600 to play audio or audiovisual media. The JAVA applets 812 may be executed by the UE 600 to provide a variety of functionality including games, utilities, and other functionality.

Figure 8B:
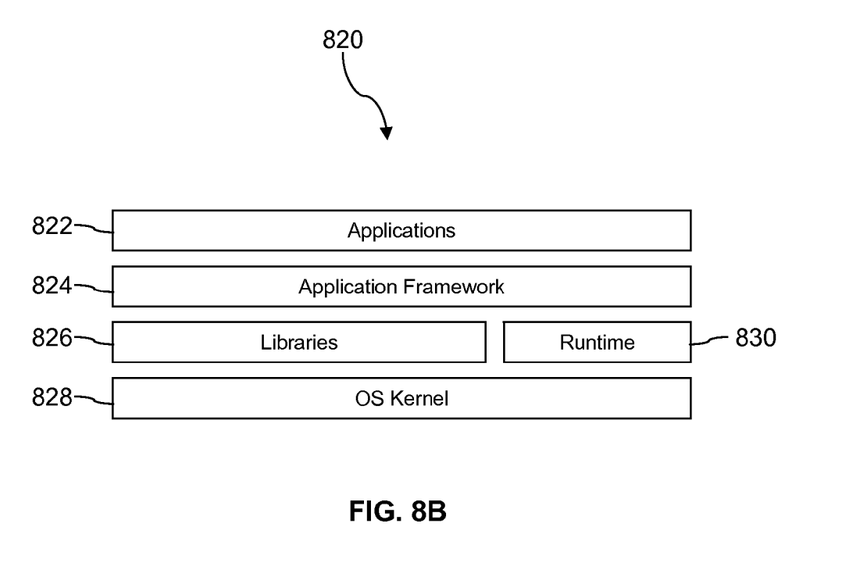
FIG. 8B is a block diagram of another software architecture of a mobile communication device according to an embodiment of the disclosure.

FIG. 8B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

Figure 9:
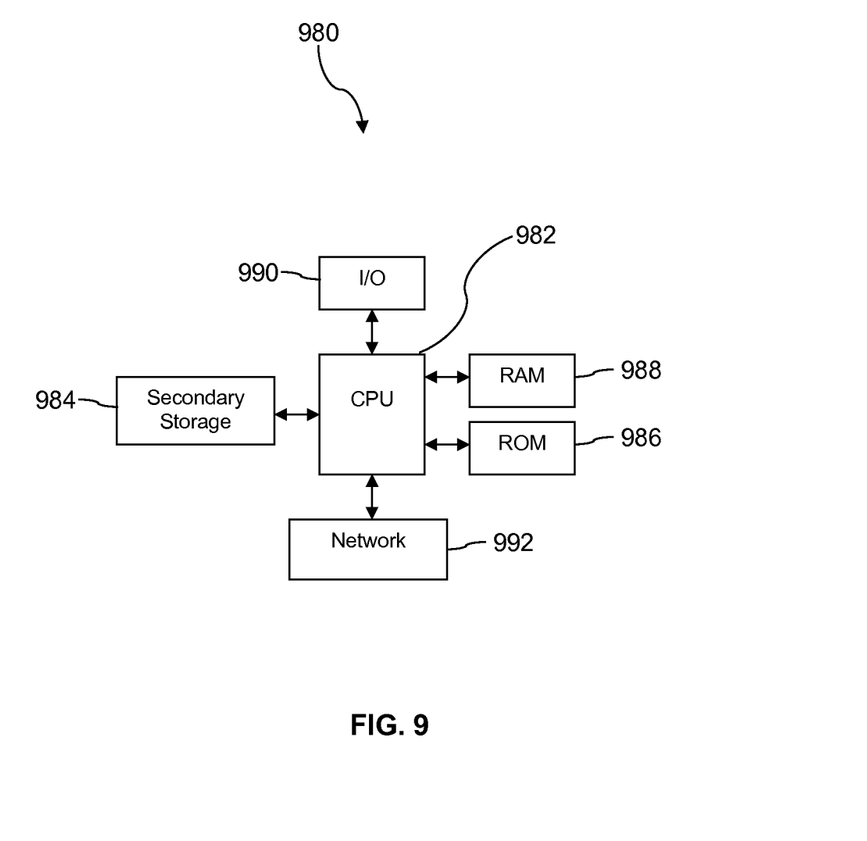
FIG. 9 illustrates an exemplary computer system suitable for implementing the several embodiments of the disclosure.

FIG. 9 illustrates a computer system 980 suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 980 is turned on or booted, the CPU 982 may execute a computer program or application. For example, the CPU 982 may execute software or firmware stored in the ROM 986 or stored in the RAM 988. In some cases, on boot and/or when the application is initiated, the CPU 982 may copy the application or portions of the application from the secondary storage 984 to the RAM 988 or to memory space within the CPU 982 itself, and the CPU 982 may then execute instructions that the application is comprised of. In some cases, the CPU 982 may copy the application or portions of the application from memory accessed via the network connectivity devices 992 or via the I/O devices 990 to the RAM 988 or to memory space within the CPU 982, and the CPU 982 may then execute instructions that the application is comprised of. During execution, an application may load instructions into the CPU 982, for example load some of the instructions of the application into a cache of the CPU 982. In some contexts, an application that is executed may be said to configure the CPU 982 to do something, e.g., to configure the CPU 982 to perform the function or functions promoted by the subject application. When the CPU 982 is configured in this way by the application, the CPU 982 becomes a specific purpose computer or a specific purpose machine.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), flash drive, ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer system 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing an out-of-the-box mobile communication device setup process on a mobile communication device, comprising:
   collecting ambient information during an initial setup phase of the mobile communications device, wherein the collecting comprises:
      detecting a plurality of wireless network service set identifiers (SSIDs) via a radio transceiver of the mobile communication device, and
      evaluating the detected SSIDs to determine a probable language common to an area in which the SSIDs were detected according to alphanumeric character selection used in the detected SSIDs or according to cultural variation in names used in the detected SSIDs;
   determining, based on the evaluation of the detected SSIDs, a default language via a processor of the mobile communication device for use during the mobile communication device setup process according to the ambient information, wherein the ambient information indicates a probable language associated with a geographic region in which the mobile communication device is located during the mobile communication device setup process;
   presenting a user via a screen of the mobile communication device with one or more screens of visual feedback according to the determined default language;
   receiving from the user via the mobile communication device, control input in response to the visual feedback; and
   based on the received control input, executing instructions via the processor of the mobile communication device to:
      progress to a next step in the mobile communication device setup process when the received control input indicates to progress to the next step;
      display via the screen of the mobile communication device a list of user-selectable options when the received control input indicates to present the user-selectable options; and
      toggle a state of the user-selectable options when the received control input indicates to toggle the state of the user-selectable options.

2. The method of claim 1, further comprising:
   collecting device specific information during the initial setup phase of a mobile communications device; and
   comparing the device specific information and the ambient information to determine a probability of accuracy for the default language.

3. The method of claim 1, wherein the ambient information collected further comprises a plurality of audio signals detected via a plurality of microphones of the mobile communication device.

4. A mobile communication device, comprising:
   a radio transceiver to communicatively couple the mobile communication device to a radio access network by a wireless communication link;
   a processor coupled to the radio transceiver;
   a memory coupled to the processor; and
   an application stored in the memory that, when executed by the processor:
      collects language information for use in determining a default language for the mobile communication device, wherein collecting the language information comprises at least one of:
         detecting a plurality of wireless network service set identifiers (SSIDs) via the radio transceiver and evaluating the detected SSIDs to determine a probable language common to an area in which the SSIDs were detected according to alphanumeric character selection used in the SSIDs or according to cultural variation in names used in the SSIDs, or
         detecting a front facing microphone language spoken by a user of the mobile communication device, detecting a noise-cancelling microphone language spoken by one or more persons in a same area as the user of the mobile communication device, and comparing the front facing microphone language and the noise-cancelling microphone language to determine a probability of the user and the person in the same area as the user speaking the same language;
      analyzes the language information to determine a probability of accuracy of the default language, wherein analyzing the language information comprises assigning a weighted value to each piece of collected language information and determining a language to use as the default language based on the weighted values; and
      assigns the default language to the mobile communication device.

5. The mobile communication device of claim 4, wherein the mobile communication device is one of a mobile phone, a personal digital assistant, a wireless enabled computer, or a media player.

6. The mobile communication device of claim 4, wherein the radio transceiver establishes a wireless communication link with the radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

7. The mobile communication device of claim 4, wherein collecting the language information further comprises:
   analyzing a mobile country code of a subscriber identification module (SIM) card installed in the mobile communications device; and
   determining a country and language associated with the mobile country code of the SIM card.

8. The mobile communication device of claim 4, wherein collecting the language information further comprises receiving a data payload from a server that indicates a language selected by a user of the mobile communication device as a preferred language for the mobile communications device.

9. A method of determining a default language for a mobile communication device according to a Uniform Integrated Circuit Card (UICC) comprising executing a bootstrap application via a processor of the mobile communication device, wherein the bootstrap application comprises instructions for:
   transmitting a request for profile information to a bootstrap server via a transceiver of the mobile communication device;
   receiving the profile information for the UICC from the bootstrap server via the transceiver;

populating profile fields of the UICC according to the received profile information, wherein populating the profiles fields comprises writing the received profile information to the UICC;

when a populated profile field of the UICC indicates a preferred language for the mobile communication device, setting the default language of the mobile communication to the preferred language; and when no populated profile field of the UICC indicates a preferred language for the mobile communication device, comparing a mobile country code (MCC) value of the UICC with one or more default language determination factors in a weighted comparison, the one or more default language determination factors determined by collecting ambient information of an area adjacent to the mobile communication device, wherein the collecting comprises detecting a plurality of wireless network service set identifiers (SSIDs) via the transceiver and evaluating the detected SSIDs to determine a probable language common to an area in which the SSIDs were detected according to at least one of alphanumeric character selection used in the SSIDs or cultural variation in names used in the SSIDs.

10. The method of claim 9, wherein the ambient information further comprises verbal utterances of a user of the mobile communication device.

11. The method of claim 9, wherein the UICC is an embedded UICC that is not removable from the mobile communication device.

* * * * *